United States Patent [19]

Blander et al.

[11] Patent Number: 4,925,488

[45] Date of Patent: May 15, 1990

[54] REMOVAL OF COPPER FROM FERROUS SCRAP

[76] Inventors: Milton Blander, 12833 S. 82nd Ct., Palos Park, Ill. 60464; Shome N. Sinha, 5748 Drexel, 2A, Chicago, Ill. 60637

[21] Appl. No.: 79,389

[22] Filed: Jul. 30, 1987

[51] Int. Cl.$^5$ .............................................. C21C 7/76
[52] U.S. Cl. ...................................................... 75/562
[58] Field of Search ............... 75/45, 63, 44.5, 78, 75/53, 43, 44 R, 45, 28

[56] References Cited

U.S. PATENT DOCUMENTS

| | | | |
|---|---|---|---|
| 671,988 | 0/1901 | Burfeind | 75/63 |
| 1,377,217 | 0/1921 | Mullen | 75/85 |
| 1,425,701 | 0/1922 | Sem | 75/63 |
| 2,115,300 | 4/1938 | Butcher | 75/78 |
| 2,512,578 | 0/1950 | Jordon | 75/44.3 |
| 3,441,404 | 0/1969 | Ivey | 75/76 |
| 3,666,441 | 11/1968 | Milner | 75/78 |

FOREIGN PATENT DOCUMENTS

| | | | |
|---|---|---|---|
| 1227689 | 4/1986 | U.S.S.R. | 75/53 |
| 1102971 | 2/1968 | United Kingdom | 75/78 |

*Primary Examiner*—Melvyn J. Andrews

[57] ABSTRACT

A process for removing copper from ferrous or other metal scrap in which the scrap is contacted with a polyvalent metal sulfide slag in the presence of an excess of copper-sulfide forming additive to convert the copper to copper sulfide which is extracted into the slag to provide a ratio of copper in the slag to copper in the metal scrap of at least about 10.

6 Claims, No Drawings

REMOVAL OF COPPER FROM FERROUS SCRAP

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to the reduction in content of one or more metallic impurities from molten metals and more particularly to the reduction in content of copper from ferrous metal scrap.

For the production of steel in the United State, the increased use of ferrous metal scrap for steel would have a number of advantages. Usually, scrap is a less expensive source of ferrous metal compared to many ores. Also, scrap is often readily available and does not require extensive reduction processes before being added to the melt. In addition, the increased use of scrap would reduce the problem of storing or disposal of excess scrap.

One of the limitations in the use of scrap for steel production involves the content of impurities in the scrap. Copper is one impurity capable of causing particular problems in the production and use of stel products. In the production of steel, a copper content in the order of 0.5 wt.% has been reported to cause surface cracking during reheating and rolling. In some commercial uses such as tire cord, copper content is limited to a maximum of 0.05 wt.% with lower values being desirable. A common scrap melt may contain a copper level between 0.2 and 0.6 wt.% which would necessitate a significant use of high-grade and more expensive scrap with low copper in the charge.

U.S. Pat. No. 2,512,578, U.S. Pat. No. 3,441,404, U.S. Pat. Nos. 1,425,701 and 1,377,217 provide some background details on the problem of copper in ferrous metals and methods of removal. In U.S. Pat. No. 2,512,578, (which involves both the removal of copper and the added sulfur), sulfur is added in small amounts to the molten ferrous metal to convert the copper to copper sulfide with the resulting sulfur content in the metal scrap being limited to a low value. In a subsequent stage, a metal sulfide slag is contacted with the molten scrap to extract copper sulfide. Sodium sulfide, potassium sulfide and aluminum sulfide are disclosed as slag components.

In U.S. Pat. No. 3,441,404, sulfur and a halide-containing compound are added to the melt to remove a copper-sulfur compound during distillation of the halide. In U.S. Pat. No. 1,425,701, metal sulfides such as iron sulfide are disclosed for converting the copper to copper sulfide. In U.S. Pat. No. 1,377,217, a sulfidizing material is added to scrap iron in a furnace to form copper sulfide which is removed by processing in a leaching tank.

As disclosed above, the reduction in copper content involves both the conversion of copper to copper sulfide or other compounds and its removal by extraction, distillation or other techniques. Each step of the process has particular problems. In U.S. Pat. No. 2,512,578, the sulfur addition to molten scrap is limited to provide a low sulfur content in resulting ferrous metal. Extractions by a metal sulfide slag are limited by the difficulty of achieving a reasonable degree of extraction while avoiding significant dissolution of the sulfide slag in the molten metal.

Accordingly, one object of the invention is the increased use of metal scrap and particularly ferrous metal scrap in the industrial production of metal products. A second object of this invention is a process for reducing the content of impurities in molten metals or in solid metal scrap containing separate copper bodies (wires, connectors, bus bars, etc.) which cannot be economically separated otherwise. Another object of the invention is a process for reducing the copper content of ferrous metal scrap. An additional object of the invention is a process for the extraction of copper as a sulfide from ferrous metal scrap while limiting any significant dissolution or reaction of the slag in the molten or solid ferrous metal. A further object of the invention is a process for the reduction of the copper content of ferrous metal scrap together with a reduction in the process steps associated with copper sulfide formation and removal. These and other objects will become apparent from the following disclosure.

SUMMARY OF THE INVENTION

Briefly, the invention is directed to a process in which a metal such as a ferrous metal scrap containing a copper impurity is contacted with a slag composed of an extractant having an affinity for copper sulfide above that of the metal with a copper-sulfide forming additive being present in sufficient excess to convert the impurity to copper sulfide and provide through the extraction of copper sulfide into the slag a ratio of copper in the slag to copper in the metal of at least about 10. The metal may be molten and contain dissolved copper or the metal and copper may be in the form of small particles with the copper physically separate. The excess of the additive with respect to copper is preferably equal to a factor in the range of about 3–25 and used to drive the reaction to convert increased amounts of copper in the molten metal to copper sulfide. With FeS as the additive, the reaction is as follows:

$$2Cu + FeS \rightleftharpoons Cu_2S + Fe$$

As indicated by the reaction, an excess of FeS in the reaction will convert a higher percentage of copper to copper sulfide.

The extractment of the slag is preferably a polyvalent metal sulfide (or sulfides) selected to provide a medium for extraction of copper sulfide from the molten scrap thereby causing additional copper sulfide to be formed in the scrap. The extractment is also selected to limit the reverse dissolution of the polyvalent metal sulfide or sulfides in the molten metal. Preferably, the copper-sulfide forming additive is present in the slag and is extracted into the metal to convert the copper impurity to copper sulfide. In the case of molten scrap, carbon may also be present to provide a lower processing temperature and limit fuming.

DETAILED DESCRIPTION OF THE PREFERRED EMBODIMENT

This invention is useful in reducing the copper content of molten and solid metals such as iron, lead and the like used as major components in industrial products. Advantageously, the invention is useful for converting ferrous metal scrap to a more valuable feedstock for steel operations. The ferrous metal scrap useful in the inventive process may be obtained from a variety of sources although the type and content of the impurities will be limited by the expected use of the final product.

Usually, the ferrous metal scrap of importance in the process has a copper content above about 0.1 wt.% and more commonly a content in the range of about 0.2 to about 0.6 wt.%. The copper is usually present in metallic form in solid solution characterizing the scrap or as separate copper-rich phases. Other minor components of scrap such as manganese, nickel and carbon may also be present in small quantities. In one embodiment, the scrap is converted to a molten scrap by being heated to liquifying temperatures in the order of about 1300° to 1600° C. in a suitable containment vessel or may be kept as a finely divided solid at much lower temperatures of about 950° to 1200° C.

In the inventive process, the scrap is contacted with a copper-sulfide forming additive preferably while in contact with a slag composed of an extractant having an affinity for the copper sulfide to extract sufficient copper sulfide to provide a ratio or distribution coefficient of Cu(slag)/Cu(scrap) of at least about 10 and preferably at least about 20. The additive is present in amounts sufficient to provide an excess of sulfur usually as iron sulfide in the slag following the conversion. At least about 2 wt.% of the additive based on the slag is usually used and preferably about 3–25 wt.%. With a ferrous metal scrap the additive is sulfur or a sulfide of a metal useful in the scrap such as Fe or a metal such as nickel useful in the final ferrous metal composition. With a scrap of another metal such as lead, the additive may be lead sulfide. With a ferrous sulfide as the additive, the reaction may be characterized by the following:

$$2Cu + FeS \rightarrow Cu_2S + Fe.$$

The reaction is characterized by a small negative standard free energy change and an equilibrium constant somewhat greater than unity. Preferably, the extractant provides a medium in which the activity coefficients of $Cu_2S$ are low and the activities of FeS are high. With an excess of the FeS in the molten slag and continued contact of metal with the slag as an extraction medium, larger conversions of Cu to $Cu_2S$ are achieved. Usually, an excess of the additive in the slag greater than 10 wt.%, advantageously greater than about 20 wt.%, and preferably greater than about 30 wt.% is used and results in the desired excess of sulfur. The additive may be added to a melt or preferably may be added to the slag. Although added to the slag, the sulfur or metal sulfide is transferred into molten metal to maintain an excess of sulfur or sulfide to limit the transfer of the polyvalent metal atoms into the metal. This is important to limit the loss of slag and to minimize the need for further refining of the metal product.

In addition to the excess of the additive being present, the formation and extraction of copper sulfide is enhanced by the slag being in contact with the molten metal or mixture containing the primary metal and solid particles of copper during the formation of copper sulfide. The slag includes an extractant capable of extracting copper sulfide into the slag to cause the reactor to form additional copper sulfide. Suitably, the extractant is one or more of the polyvalent metal sulfides with the selection dependent on the composition of the molten metal. In general, aluminum sulfide and/or manganese sulfide may be used with aluminum sulfide being preferred for ferrous metal and lead scrap. The amount of the polyvalent metal sulfide in the slag is usually at least about 60 wt.% and preferably about 70 to 98 wt.%.

With the polyvalent metal sulfide being selected for a desirable degree of extraction, the ratio of slag to molten scrap may be in the range of 1:2 to 1:10. With aluminum sulfide, a value in the order about ;b 1:4 provides particularly useful results.

For molten ferrous scrap, the process is carried out at a temperature in the order of 1350°–1600° C. For solid ferrous scrap, much lower temperature are possible, e.g., down to 950° C. for a multicomponent slag. With stirring by state of the art techniques, the time sufficient for the conversion and extraction process may be in the order of 10–100 minutes depending on the size of the melt.

The process is carried out for a time sufficient to achieve the desired conversion and extraction steps. The time is dependent on the quantities of materials, temperature, degree of mixing and other factors associated with this type of process. Usually with mixing of the materials, the time is less than one hour and preferably in the order of 10–30 minutes. Without mixing, the time may extend to 2–4 hours or more.

While the resulting refined metal contains excess sulfur or sulfide, the quantity may be reduced by conventional processing procedures utilizing other slags with high sulfide capacity. Slags containing calcium (metal) or calcium oxide or sodium oxide would usually be suitable.

The following example is provided for illustrative purposes and is not intended to be restrictive as to the scope of the invention:

EXAMPLE I

In a process to demonstrate the invention, a slag composed of about 2.61 gm. of $Al_2S_3$ and about 0.375 gm. of FeS with no copper was mixed with about 11.815 gm. of cast iron containing 0.2 wt.% copper as in impurity. The molten metal was stirred and the cold slag was then added. The mixture was maintained at about 1350° C. for about 3 hours with little stirring and the slag separated to provide about 76.5% slag recovery. Analysis of the metal provided the following results; 0.29 wt.% Al, 91.00 wt.%, Fe, 0.03 wt.% Cu and 0.54 wt.% S. The remaining composition was largely carbon. Analysis of the slag provided the following results: 22.72 wt.% Al, 19.1% Fe, 0.76 wt. % Cu, and 37.8 wt.% S with the remainder being oxygen. Some of the iron may have been present as adhering metal. As indicated above, a substantial portion of the copper was extracted into the slag with only about 0.03 wt.% of the copper remaining in the molten metal. The distribution coefficient of Cu(slag)/Cu/scrap) for the test was about 25.

Previously, distribution coefficients for copper extraction from molten ferrous scrap by contact with a slag have been usually in the order of about 6–7.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which the exclusive property or privilege is claimed are defined as follows:

1. A process for reducing the content of a copper impurity in ferrous metal comprising the steps of:

providing a slag containing a polyvalent metal sulfide as an extractant having an affinity for copper sulfide above that in the metal, the slag being present in a weight ratio to the metal of about 1:2–1:10, contacting the slag with the metal in the presence of an excess of a copper-sulfide forming additive sufficient in amount and time to convert the copper impurity to copper sulfide, the amount of the additive being greater than about 30 wt.% in excess of the reactive requirements for the reaction of the additive and copper to form copper sulfide and greater than about 2 wt.% of the slag, with the excess being sufficient to provide through the extraction of copper sulfide into the slag a ratio of copper in the slag to copper in the metal of at least about 20, and separating the slag and metal having a reduced content of copper.

2. The process of claim 1 in which the copper-sulfide forming additive is iron sulfide.

3. The process of claim 2 wherein the step of providing a polyvalent metal sulfide slag provides an in which the polyvalent metal sulfide is aluminum sulfide.

4. The process of claim 3 including the step of adding iron sulfide to the slag prior to the contacting step to result in a sulfur content in the ferrous metal.

5. The process of claim 4 including a step of subsequently reducing the sulfur content of the ferrous metal.

6. The process of claim 1 in which the copper sulfide forming additive is nickel sulfide.

* * * * *